D. F. Hartford.
Pipe & Rod Cutter.
N° 73528. Patented Jan. 21, 1868.
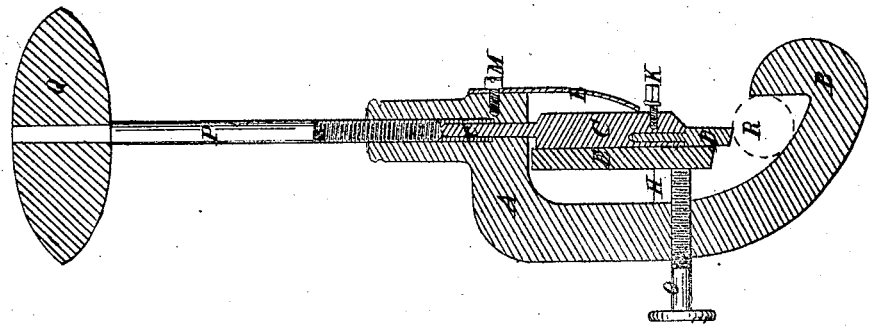
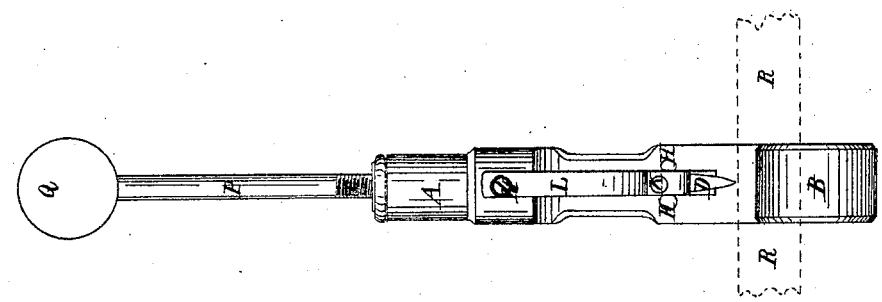
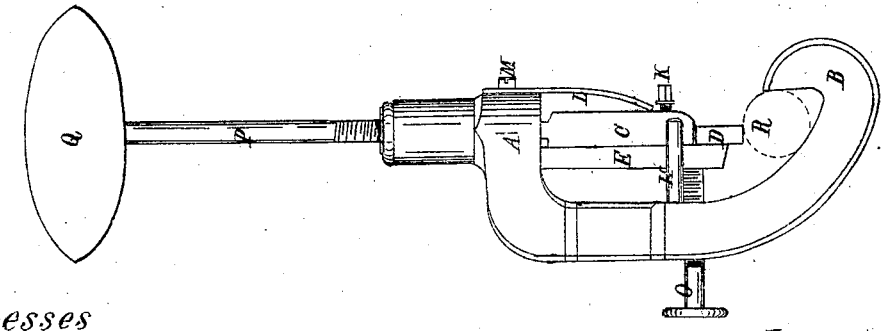
Witnesses
A. Lyon Berry
Frank G. Parker
Inventor.
D Frank Hartford

United States Patent Office.

D. FRANK HARTFORD, OF BOSTON, MASSACHUSETTS, ASSIGNOR TO HIMSELF AND EDMUND TARBELL, OF SAME PLACE.

Letters Patent No. 73,528, dated January 21, 1868.

IMPROVEMENT IN PIPE AND ROD-CUTTER.

The Schedule referred to in these Letters Patent and making part of the same.

TO ALL WHOM IT MAY CONCERN:

Be it known that I, D. FRANK HARTFORD, of Boston, in the county of Suffolk, and State of Massachusetts, have invented certain new and useful Improvements in Pipe and Rod-Cutters; and I do hereby declare that the following is a full and exact description thereof, reference being had to the accompanying drawings, and to the letters of reference marked thereon.

The nature of my invention consists in an arrangement by which the cutting-tool of a pipe and rod-cutter may be adjusted, both longitudinally and laterally.

To enable others skilled in the art to make and use my invention, I will proceed to describe its construction and use. In the drawings—

Figure 1 is a side elevation of my improved cutter.

Figure 2 is a front elevation of the same.

Figure 3 is a longitudinal section of the same.

I construct my improved cutter in the following manner: A B is a strong bar of metal, bent and worked as shown in the drawings, the part B forming a hook, as shown in figs. 1 and 3, said hook serving as a holder for keeping in place the tube or rod to be cut. A forms a shank, through which the screw P works, and also serves to hold one end of the cutter-holder C. The cutter-holder C is provided with a shank, C', fig. 3, which fits loosely in an orifice made in A, so that the cutter D, which is held to the holder by means of the set-screw K, is free to rise up and down, that is, it is capable of lateral adjustment by the screw O. H H are two guides, between which the cutter-holder C and bolster E play. E is a bolster, which serves to support the holder C and the cutter D. The screw O works against the bolster E. L is a spring, which acts against the holder C, and serves to bear it down against the bolster E. The screw P operates against the cutter-holder C, to push it and the cutter D against the article to be cut.

It will be seen that in my invention, the cutter D has two adjustments, that is, a longitudinal one by the screw P, and a lateral one by the screw O. The cutter D is sharpened so as to work in the same manner that the cutter of a turning-lathe operates; it does not jam into the metal, but cuts it out.

To use my invention, the tube or rod of metal to be cut is placed as indicated by R. The cutter D is so adjusted as to cut into the tube or rod, in the same manner that a cutting-tool of a turning-lathe operates upon a revolving cylinder, that is, a small chip or "turning" is cut out at each revolution. Everything being properly adjusted, the cutter is revolved around the rod, being set up slightly at each revolution, until the rod is cut to a sufficient depth to render its fracture easy.

What I claim as my invention, and desire to secure by Letters Patent, is—

1. The cutter-holder C, combined with the feed-screw P and the adjusting-screw O, made substantially as described, and for the purpose set forth.

2. The cutter-holder C and knife D, combined with the supporting-bolster E, made substantially as described, and for the purpose set forth.

D. FRANK HARTFORD.

Witnesses:
Jos. S. CONAUT,
FRANK G. PARKER.